United States Patent [19]

Aizawa et al.

[11] Patent Number: 5,617,535

[45] Date of Patent: Apr. 1, 1997

[54] RECORDING AND PLAYBACKK APPARATUS

[75] Inventors: Toshiro Aizawa, Ebina; Shigemitsu Higuchi, Fujisawa; Hiromasa Fujii, Katsuta, all of Japan

[73] Assignee: Hitachi, Ltd., Tokyo, Japan

[21] Appl. No.: 978,729

[22] Filed: Nov. 19, 1992

[30] Foreign Application Priority Data

Mar. 3, 1992 [JP] Japan .................................. 4-045571

[51] Int. Cl.$^6$ .................................. G06F 11/00
[52] U.S. Cl. .................. 395/183.22; 395/183.21; 395/183.18; 395/183.01; 360/31; 369/53; 369/54
[58] Field of Search ............... 371/29.1, 15.1, 371/3, 16.5, 72; 364/431.03, 521, 410; 360/70, 72.2, 73, 53; 379/88, 84, 68; 370/110.2; 395/183.21, 183.22, 183.18, 185.07

[56] References Cited

U.S. PATENT DOCUMENTS

| | | | |
|---|---|---|---|
| 4,422,105 | 12/1983 | Rodesch et al. | 364/521 |
| 4,506,305 | 3/1985 | Cardero | 360/46 |
| 4,514,671 | 4/1985 | Louth | 318/603 |
| 4,536,806 | 8/1985 | Louth | 360/69 |
| 4,538,190 | 8/1985 | Louth | 360/73 |
| 4,549,227 | 10/1985 | Hashimoto et al. | 360/36.2 |
| 4,636,858 | 1/1987 | Hague et al. | 364/521 |
| 4,649,442 | 3/1987 | Kunii et al. | 360/72.2 |
| 4,724,495 | 2/1988 | Hedberg et al. | 360/70 |
| 4,855,842 | 8/1989 | Hayes et al. | 358/342 |
| 4,958,367 | 9/1990 | Freer et al. | 379/84 |
| 5,127,004 | 6/1992 | Lenihan et al. | 370/110.2 |
| 5,164,831 | 11/1992 | Kuchta et al. | 358/209 |
| 5,218,406 | 6/1993 | Ebner | 371/16.4 |

OTHER PUBLICATIONS

ITEJ, Technical Report vol. 11, No. 24, pp. 13–18, VR'87-30 (Oct., 1987). (No Translation).

*Primary Examiner*—Robert W. Beausoliel, Jr.
*Assistant Examiner*—Dieu-Minh Le
*Attorney, Agent, or Firm*—Antonelli, Terry, Stout & Kraus

[57] ABSTRACT

A recording and playback apparatus for recording and playing back onto and from a magnetic tape and utilizable with a memory card adapted to be mounted onto the apparatus. The memory card is adapted to at least one of store operational characteristics for the apparatus to enable automatic setting of the operational characteristics of the apparatus when mounted and, if the apparatus includes a self-diagnostic information unit, the memory card enables storage of at least self-diagnostic information generated upon occurrence of a trouble during operation of the apparatus. The stored self-diagnostic information enables analyzing of the cause of a cause of the trouble occurring during operation of the apparatus at a time subsequent to the occurrence and taking of countermeasures with respect thereto. If the memory card is not mounted or is in a nonwritable state, the apparatus is provided with a storage device for storing the self-diagnostic information. The memory card also enables storage of other information relating to the apparatus.

38 Claims, 7 Drawing Sheets

RECORDING AND PLAYBACKK APPARATUS

BACKGROUND OF THE INVENTION

The present invention relates to a recording and playback apparatus such as a digital magnetic recording and playback apparatus (hereinafter referred to as DVTR) for recording and playing back a magnetic tape and, in particular, to a recording and playback apparatus having a self-diagnostic function for providing diagnostic information when a trouble or problem occurs in an operation thereof.

As a conventional recording and playback apparatus, for example, a DVTR of D2 format as described in ITEJ, Technical Report Vol. 11, No. 24, pp. 13 to 18. VR' 87-30 (October, 1987) is known. In such a recording and playback apparatus, a self-diagnostic function is provided for the occurrence of a trouble in operation thereof, and a display on a control panel of the VTR provides information indicative of in what part of the apparatus the trouble occurs or what is the cause of the trouble at a later time of nonoperation.

In a case of programmed or timer controlled recording, for example, even though a VTR is being operated, a user is not necessarily beside the VTR. In such a case, even when a trouble occurs in the VTR, the user is not aware of the trouble and is unable to take proper measures immediately for determining the cause of the trouble. In general, it might take an extremely long time to determine the cause of the trouble and to take proper measures for correcting the trouble, and in some cases, the cause of the trouble cannot be determined within a short time period. In such a case, if the matters concerning the trouble are displayed only when the VTR is being operated, it is impossible to investigate the cause of the trouble and take measures against the trouble.

When a trouble occurs in a VTR, it is normal that general users of the VTR cannot find the cause of the trouble even if the trouble is displayed on a display device. Therefore, such general users are required to have a repair performed by service shops or a manufacturer. At that time, however, the trouble is no longer displayed on the display device since, for example, power has been removed from the apparatus and repairs may take longer due to a lack of the trouble information.

Furthermore, some users may have difficulty in selecting operational features for operating the VTR in a desired mode or it may be desired that a desired mode of operation is preset or always selected by a user and other users, for example, children are prevented from changing the preset desired mode even if other operational features are selected by way of the control panel thereof.

SUMMARY OF THE INVENTION

It is therefore an object of the present invention to provide a recording and playback apparatus utilizable with a memory card which is easily mountable and removable from the apparatus.

It is another object of the present invention to provide a recording and playback apparatus utilizable with a memory card having information stored thereon for enabling operational conditions of the apparatus to be preset upon mounting of the memory card onto the apparatus.

It is a further object of the present invention to provide a recording and playback apparatus with a self-diagnostic function and a memory card mountable onto the apparatus for storing information at least relating to self-diagnosis upon occurrence of a trouble.

It is another object of the present invention to provide a recording and playback apparatus with a self-diagnostic function and a memory card mountable onto the apparatus for storing information relating to self-diagnosis upon occurrence of a trouble and information relating to characteristics of the apparatus and/or containing information for enabling setting of operational features of the apparatus.

In accordance with a feature of the present invention, a memory card stores information relating to operational characteristics of a recording and playback apparatus having an arrangement for receiving and mounting the memory card therein so that upon mounting of the memory card in the recording and playback apparatus, automatic setting of operational characteristics of the recording and playback apparatus is effected.

In accordance with another feature of the present invention, a memory card adapted to be mounted in a recording and playback apparatus enables storage of self-diagnostic information data from a self-diagnostic unit of the recording and playback apparatus upon occurrence of a trouble during operation of the recording and playback apparatus, when the memory card is mounted therein and enabled for storage of such information.

According to a further feature of the present invention, a storage device having a similar function to a memory card for storing self-diagnostic information is provided within a recording and playback apparatus for recording the self-diagnostic information data from a self-diagnostic unit thereof upon occurrence of a trouble during operation as well as other desired data. When a trouble occurs during operation of the recording and playback apparatus, the self-diagnostic unit generates self-diagnostic data and such data is recorded or stored on the memory card, and if the memory card is not in a recordable state or mounted onto the apparatus, the data is recorded on the storage device. Therefore, matters concerning the trouble can be determined at any time by reading the self-diagnostic information data from the memory card or the storage device utilizing a computer, for example. Accordingly, the self-diagnostic function and information thereof is always maintained which facilitates the investigation of the cause of the trouble and the consideration of proper countermeasures.

These and other objects, features, and advantages of the present invention will become more apparent from the following description when taken in conjunction with the accompanying drawings which show, for purposes of illustration only, several embodiments of the present invention.

DESCRIPTION OF THE PREFERRED EMBODIMENTS

Figure 1:
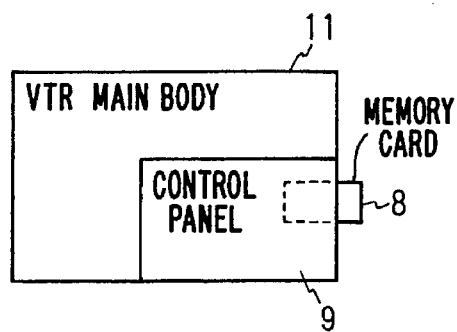
FIG. 1 is a block diagram showing a recording and playback apparatus mounting a memory card in accordance with the present invention.
Figure 2:
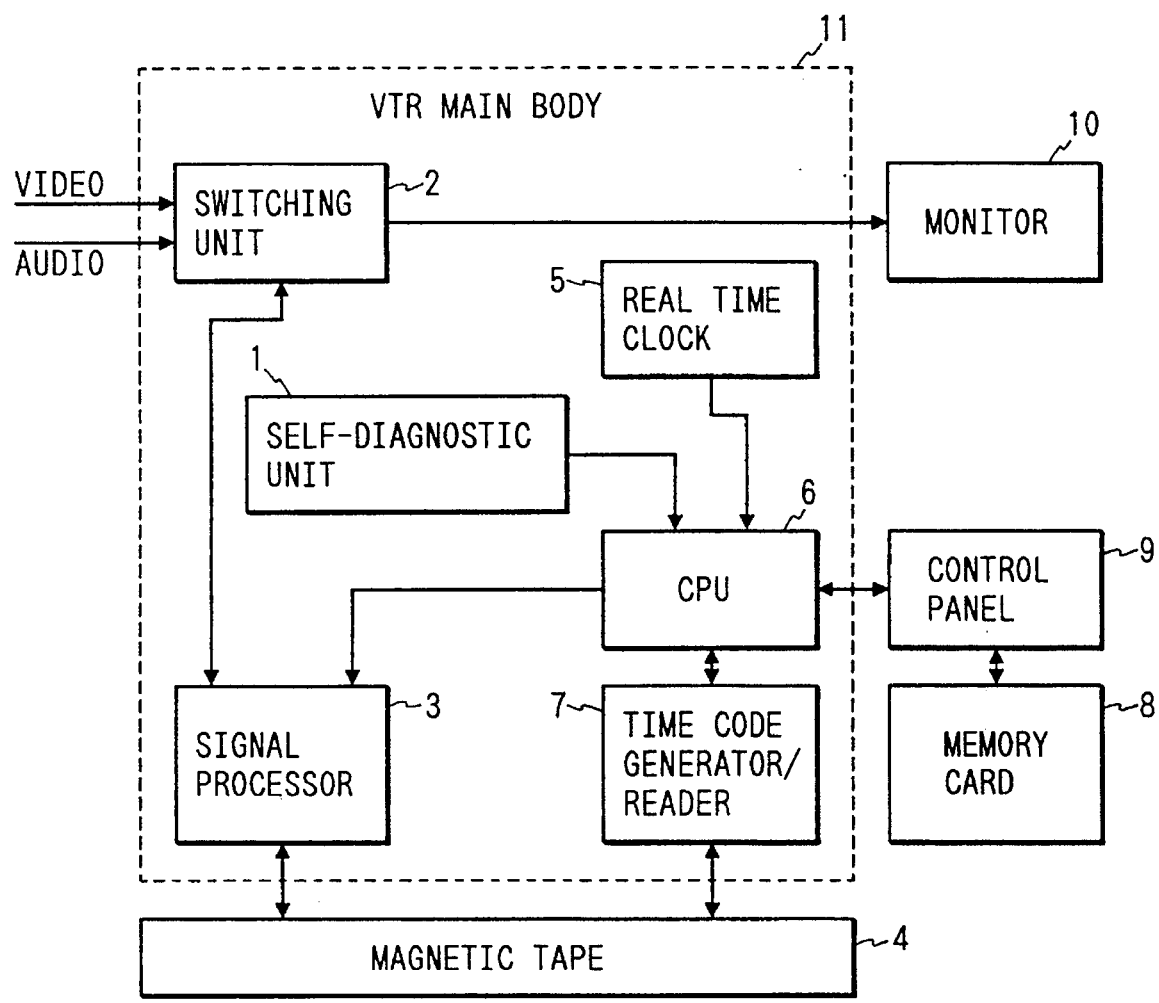
FIG. 2 is a system block diagram showing an embodiment of a recording and playback apparatus according to the present invention.

Referring now to the drawings wherein like reference numerals are utilized to designate like parts throughout the several views, FIG. 1 illustrates in block diagram form a DVTR main body 11 having a control panel 9 with a memory card 8 mounted therein in accordance with the present invention. FIG. 2 is a block diagram showing an embodiment of a recording and playback apparatus as the DVTR with the main body 11 which includes a self-diagnostic unit 1, a video/audio signals switching unit 2, a signal processor 3 for video/audio signals, a real time clock unit 5, a system controller 6 (hereinafter referred to as a CPU), and a time code generator/reader 7. The main body 11 is connectable with a magnetic tape 4 as well as a monitor 10, and with a control panel 9 of the DVTR mounting a memory card 8 for operational association with the DVTR.

As shown in FIG. 2, a video signal and an audio signal are switched by the video/audio signals switching unit 2 and, for example, divided into separate signals and then are processed in the video/audio signal processor 3 to be converted and synthesized into a recordable signal mode on the magnetic tape 4, and recorded on the magnetic tape 4. In the playback operation, a played back signal from the magnetic tape 4 is restored to the original signal by the video/audio signal processor 3 and divided into a video signal and an audio signal by the video/audio signals switching unit 2 to be supplied to the monitor 10 for display. The series of processes are managed by the CPU 6, and operations are performed by designation signals from the CPU 6.

In order to make it possible to know an absolute position on the magnetic tape 4 in a case of editing, in the recording operation, a time code generated by the time code generator/reader 7 is also recorded on the magnetic tape 4. In the playback operation, the time code played back from the magnetic tape 4 is read by the time code generator/reader 7, and the absolute positions on the magnetic tape 4 are successively generated. The recording and playback of the time code is also managed by the CPU 6. The CPU 6 performs the management in real time using a real time clock unit 5, and moreover, performs the exchange of signals with the control panel 9 and performs the management of the above-mentioned individual units based on the control signals provided to the control panel 9 by users. The memory card 8 is mountable/demountable to and from the control panel 9 for operative connection with the DVTR 11.

In the DVTR main body 11, as described later, there is provided a self-diagnostic unit 1 which generates self-diagnostic information data expressing the matters relating to a trouble in a case where a trouble occurs in the DVTR during operation thereof, and such self-diagnostic information data is recorded or stored on the memory card 8.

Figure 3:
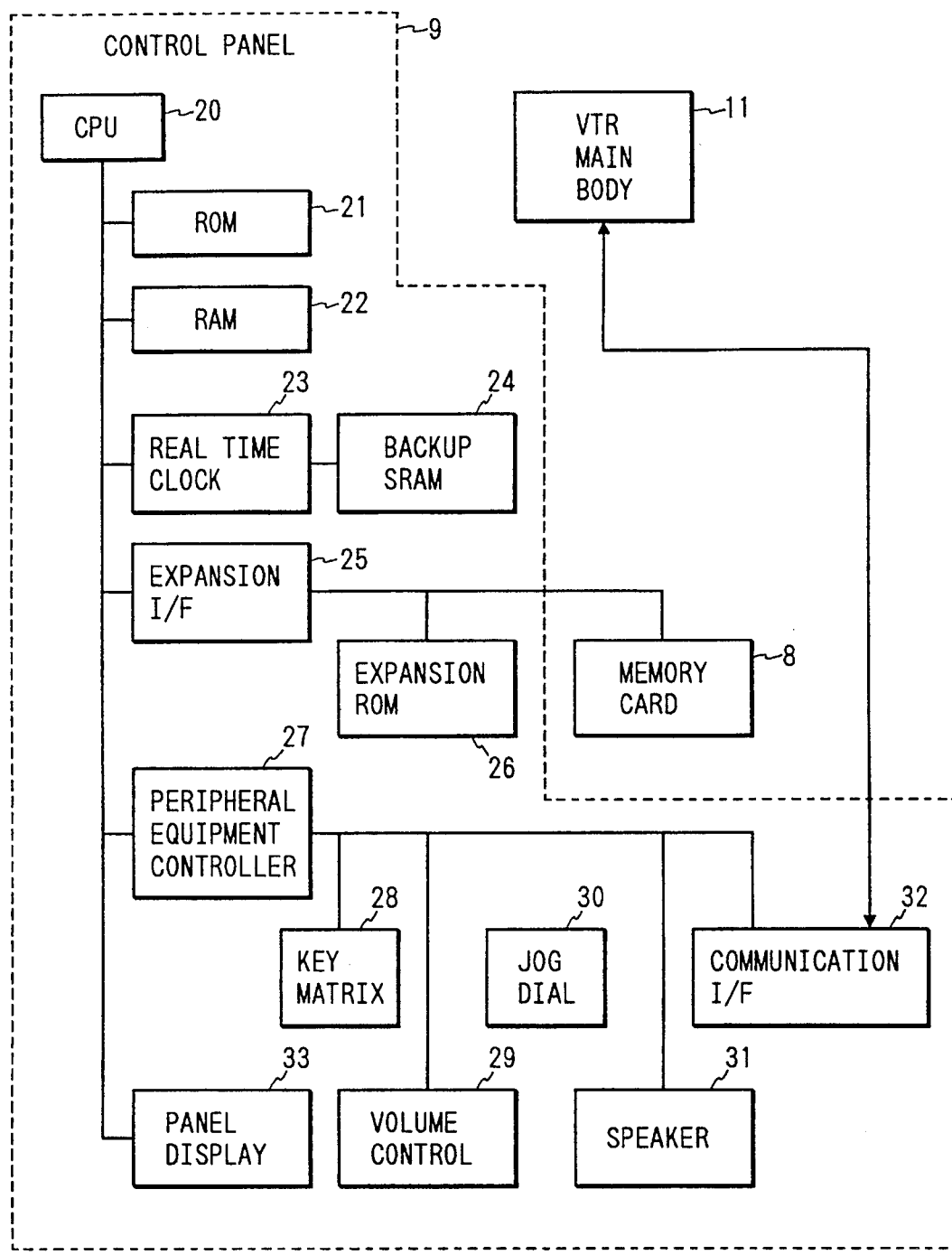
FIG. 3 is a block diagram showing an example of the control panel shown in FIG. 2.

FIG. 3 is a block diagram showing an embodiment of the control panel 9 of the VTR shown in FIG. 1 including a system controller 20 (hereinafter referred to as a control panel CPU), a ROM 21 (read only memory), a RAM 22 (random access memory), a real time clock 23, a static random access memory 24 for backup (hereinafter referred to as a backup SRAM), an interface 25 for expansion (hereinafter referred to as an expansion I/F), an expansion ROM 26, a peripheral equipment controller 27, a key matrix 28, a volume controller 29, a jog dial 30 for changing tape speed, a speaker 31, a communication interface 32 for the VTR main body (hereinafter referred to as a communication I/F), and a panel display device 33.

In FIG. 3, the output information of the key matrix 28 generated corresponding to the control of a user, that of the volume controller 29, and that of the jog dial 30 are managed by the control panel CPU 20 through the peripheral equipment controller 27. Data is displayed by the panel display device 33 based on the data mentioned above and the data stored in the ROM 21 and the RAM 22. The exchange of signals is performed with the DVTR main body 11 through the communication I/F 32, and the output information of the key matrix 28, that of the volume controller 29, and that of the jog dial 30 which output information thereof represent the expression of the intention of a user are transmitted to the DVTR main body 11. The real time clock 23 outputs a time signal expressing the real time, and the backup SRAM 24, as described later, when the memory card 8 is not in a recordable state or in a mounted state, temporarily stores the self-diagnostic information data, etc. from the self-diagnostic unit 1 (FIG. 2) in the DVTR main body 11.

Figure 4:
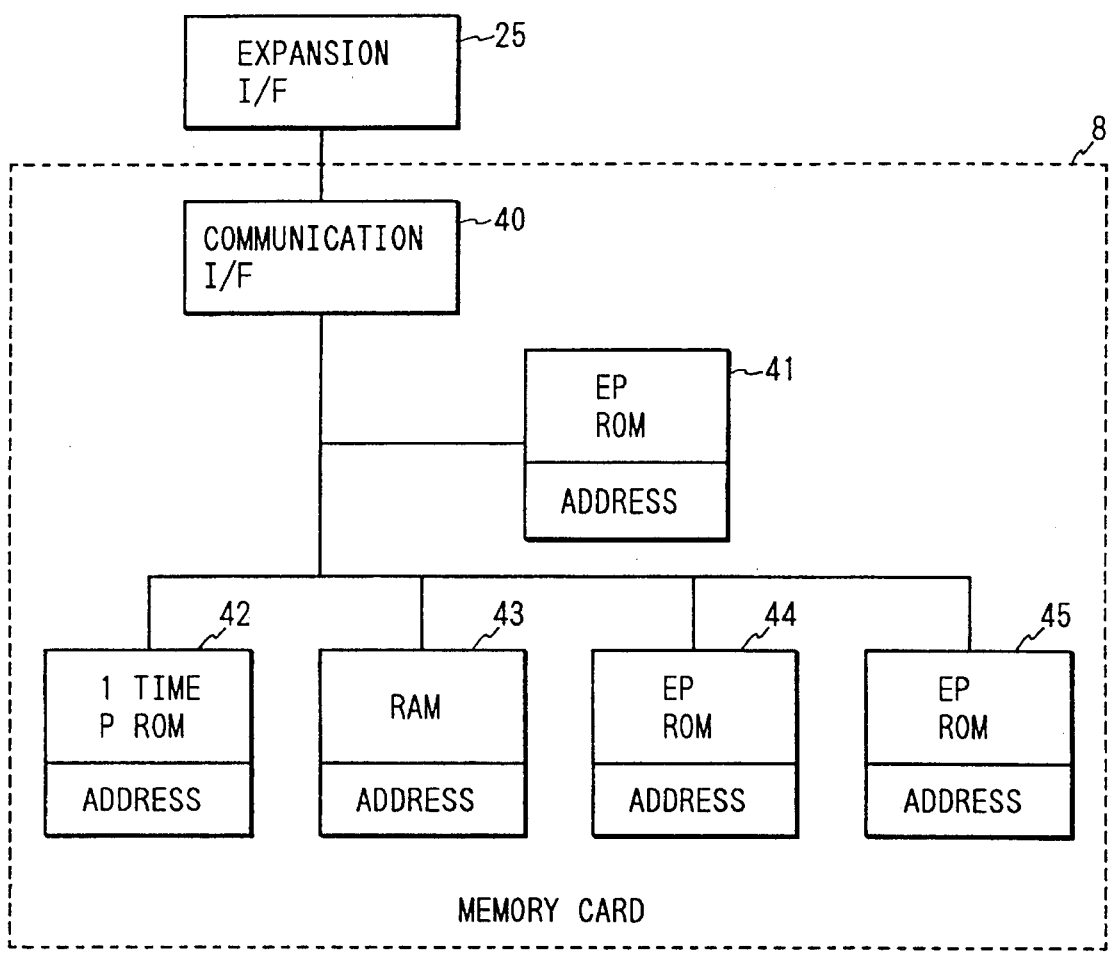
FIG. 4 is a block diagram showing an example of the memory card shown in FIG. 2.

FIG. 4 is a block diagram showing an embodiment of the memory card 8 shown in FIG. 2 including a communication I/F 40, an erasable memory 41 (hereinafter referred to as an EPROM), a reloadable memory 42 by only once (hereinafter referred to as a one time PROM), a RAM 43, and EPROM's 44 and 45. As shown, each of the storage devices 41–45 also stores address information. The memory card 8 receives the diagnostic data, etc. transmitted from the expansion I/F 25 in the control panel 9 shown in FIG. 3 at the communication I/F 40, and the data is stored in the RAM 43 or in the EPROM's 41, 44 or 45. The self-diagnostic information data stored in the RAM 43 or in EPROM's 41, 44 or 45 can be accessed through the communication I/F 40 by the CPU portion 20 in the control panel 9.

In the case of initialization of the memory card 8, for example, an area in which 2 bit data is stored expressing the feature of the memory card is previously set in the memory area of the EPROM 41, and it is made possible to protect the initialization information at the place from access to the data by a user at need, for example, by making the EPROM 44 be in a write protectable state. In this manner initialization is enabled in accordance with the stored initialization information. It is also possible to have a memory card on which a user can record data only once using a one time PROM. In other words, as described above, with the same hardware arrangement the function is made variable, and the apparatus can be used with a function conforming to a user's desire. It is also possible to make the EPROM 44 store the setup information or handling information for execution of a set mode of a DVTR and enable automatic setting of a desired mode thereof and make the EPROM 45 store the handling information such as help menu information. Even though the memory card 8 is mounted on the control panel 9, if the memory card 8 is in a trouble state itself, the generated self-diagnostic information data is stored in the backup SRAM 24 in the control panel 9 until the memory card 8 overcomes the trouble state.

The self-diagnostic information data and the necessary incidental information, to be described later, is recorded or written on the memory card 8 in order each time when such information is generated. Because of the limited storage capacity of the memory card 8, the pieces of recorded information are ranked in the order of importance, and when the capacity of the memory card 8 is full to overflowing, the lowest ranked information is replaced with new information. It thus may occur that the newest information is ranked at the highest importance.

Figure 5:
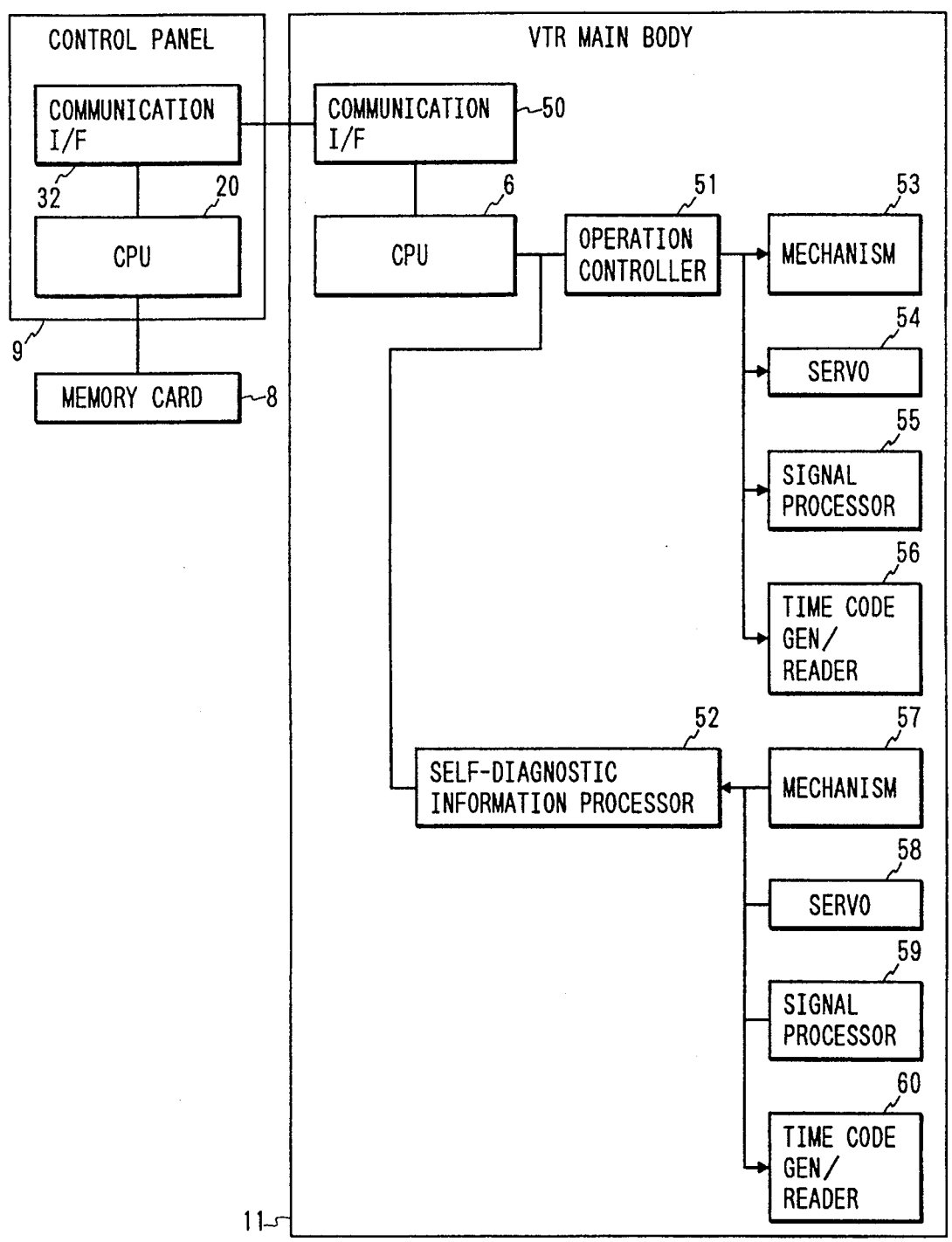
FIG. 5 is a block diagram showing an example of the self-diagnostic unit shown in FIG. 2 and portions for which diagnosis is effected.

FIG. 5 is a block diagram showing an embodiment of the self-diagnostic unit 1 shown in FIG. 2 together with other portions of the DVTR representing an object of diagnosis. As shown, there is provided communication I/F 50, an operation controller 51, a self-diagnostic information processor 52, a mechanism portion 53, a servo portion 54, a signal processor 55, a time code generator 56, a diagnostic portion 57 for the mechanism portion, a diagnostic portion 58 for the servo portion, a diagnostic portion 59 for the signal processor, and a diagnostic portion 60 for the time code generator/reader. The operation controller 51 makes the DVTR main body 11 perform a desired operation in accordance with the operation of the control panel 9 by a user. The control information from the control panel 9 according to the operation by a user is taken into the DVTR main body 11 via the communication I/F 50, and transmitted to the CPU 6. The CPU 6 makes the operation controller 51 operate corresponding to the taken in control information to transmit proper control signals to either one of, or to all of the mechanism portion 53, the servo portion 54, the signal processor 55 and the time code generator/reader 56. In a recording mode, for example, the mechanism portion 53 is operated to perform such an operation as loading or holding of a magnetic tape between a capstan and a pinch roller, the servo portion 54 is operated to perform such a servo operation as a capstan servo or a head cylinder servo, the signal processor 55 is operated to process a recording signal, and the time code generator/reader 56 is operated to record a time code on a magnetic tape.

The diagnostic portion 57 for the mechanism portion, the diagnostic portion 58 for the servo portion, the diagnostic portion 59 for the signal processor, or the diagnostic portion 60 for the time code generator/reader serve for detecting a trouble which occurs in the mechanism portion 53, the servo portion 54, the signal processing circuit 55, or the time code generator/reader 56.

Figure 6:
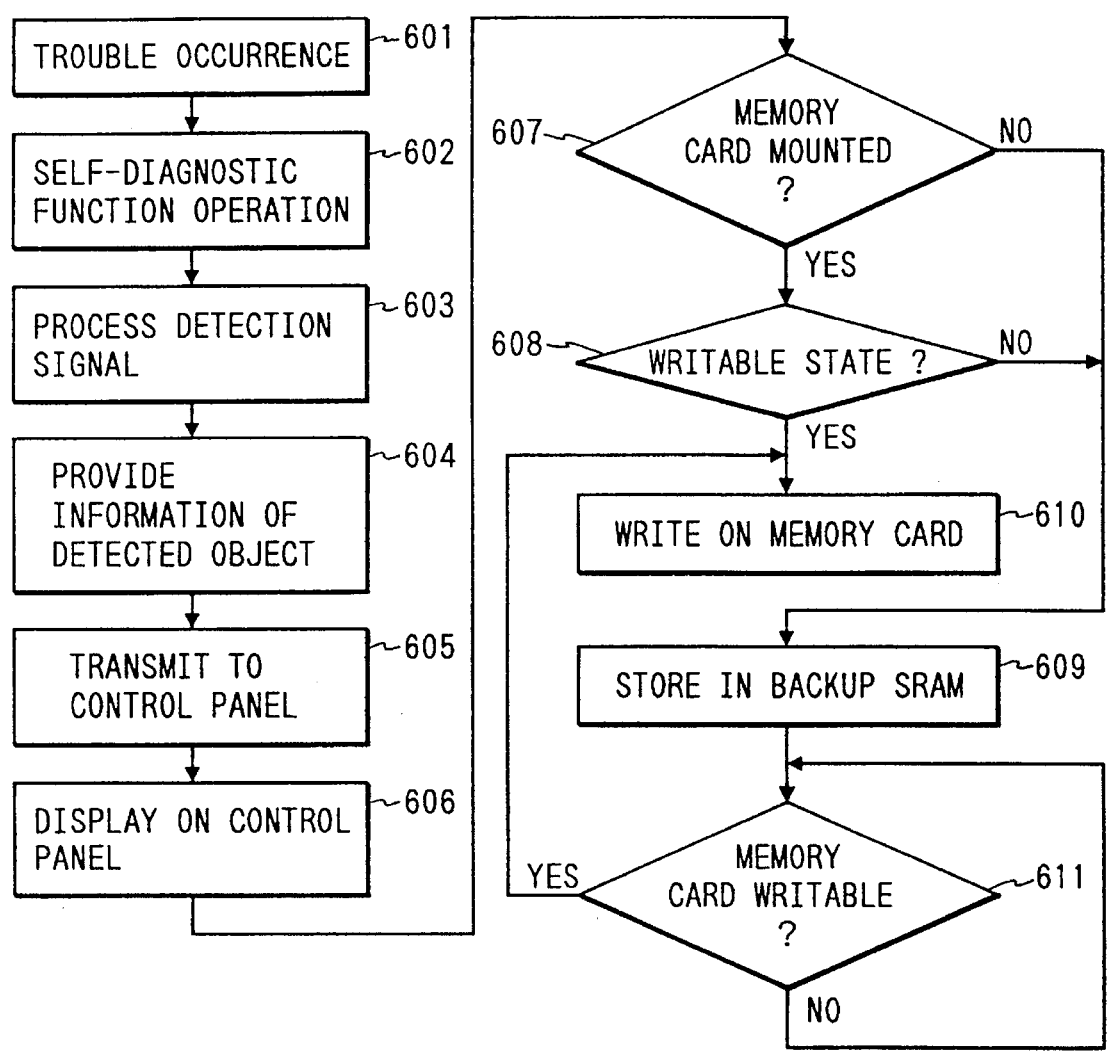
FIG. 6 is a flowchart showing an example of the generation and recording operation of self-diagnostic information data in the embodiment shown in FIG. 2.

The operation of the present embodiment when a trouble occurs will be explained referring to the flowchart of FIG. 6. Assuming that, for example, a trouble occurs in the mechanism portion 53 during the operation of the DVTR main body 11 (step 601), the diagnostic portion 57 for detected object such as for the mechanism portion detects the trouble and outputs a detection signal (step 602). The self-diagnostic information processor 52 processes the detection signal (step 603) to make the signal be the self-diagnostic information data from the diagnostic portion 57 for the detected object such as for the mechanism portion (step 604). Similar operations are provided for the diagnostic portion 58 for the servo portion, the diagnostic portion 59 for the signal processor, or the diagnostic portion 60 for the time code generator/reader, and the self-diagnostic information data is generated corresponding to respective portions by the self-diagnostic information processor 52. The self-diagnostic information data generated by the self-diagnostic information processor 52 is transmitted to the CPU 20 in the control panel 9 through the CPU 6 and the communication I/F 50 (step 605).

In the control panel 9, as shown in FIG. 3, the self-diagnostic information data is taken in through the communication I/F 32 and transmitted to the CPU 20 through the peripheral equipment controller 27. At this time, the peripheral equipment controller 27 makes the panel display device 33 display the data corresponding to the self-diagnostic information data (step 606). The CPU 20 judges if the memory card 8 is mounted on the control panel 9, and if it is, it judges if the memory card is in a recordable state (step 607 and step 608). If the memory card 8 is mounted in a recordable state, the taken-in self-diagnostic information data is transmitted to the memory card 8 through the expansion I/F 25 and stored in the memory card 8 (step 610). When the memory card 8 is not mounted on the control panel 9 or even if it is mounted, when it is not in a recordable state, e.g., a trouble state, the CPU 20 stores the taken-in self-diagnostic information data temporarily in the backup SRAM 24 (step 609). A memory can be displayed on the panel display 33 indicating that the memory card is not in a recordable state when the self-diagnostic information is recorded in the SRAM 24. When a memory card 8 in a recordable state is mounted and if a user makes a specified operation at the control panel 9 (step 611), the self-diagnostic information data stored in the backup SRAM 24 is read by the CPU 20, and the data is transmitted to the memory card 8 through the expansion I/F 25 and written or recorded on the memory card 8 (step 610).

As described above, when a trouble occurs during the operation of a DVTR 11, since self-diagnostic information data for the trouble is automatically recorded on the memory card 8 or the backup SRAM 24 in the control panel 9, even though there is not an operator present at that time, the occurrence of the trouble and the details thereof are known with certainty and an accurate investigation of the cause of the trouble and immediate proper countermeasures can be executed. Recording of such data in the memory card makes possible more precise and faster analyzation of the self-diagnostic information by use of a computer having a memory card reader and a program for analyzing such data. Additionally, if the DVTR is rendered inoperative so that the self-diagnostic information is not displayed and/or the operator is unable to obtain such information from the operation panel, the information is obtainable from the memory card by use of a computer.

In addition to the above-mentioned self-diagnostic information data, necessary information data as shown in the following is recorded on the memory card 8.

(1) Serial number of a DVTR (Set number).

(2) Time of trouble occurrence.

(3) Time elapsed since power supply is switched on.

(4) Time code.

(5) Operation mode.

(6) Operating conditions of a DVTR.

(7) Total time of use of a recording and playback head.

(8) Variable numerical value of a recording current.

(9) Variable numerical value of a playback equalizer.

(10) Existence of operation of an automatic equalizer.

(11) Mounting/demounting information of the memory card 8.

(12) Version number of a ROM in each portion.

(13) Setup information of a DVTR.

The serial number of a DVTR in item (1) is the manufacturing number, and the number is stored in the CPU 6 of the DVTR main body 11 (FIG. 6), and when a trouble occurs the number is read out and stored on the memory card 8. It can be specified which DVTR set is related to the recorded information data by recording the serial numbers of each of a plurality of DVTR's in the memory card 8. That is, in commercial usage, for example, many DVTRs are utilized in a single location and the same memory card may be mounted at different times into respective ones of the DVTRs. Thus, accurate information relating to a specific one of the DVTRs may be obtained by relating the serial number of the specific DVTR to the trouble thereof even though the memory card stores information relating to a plurality of DVTRs.

The time in item (2) is the time information from the real time clock 5 in the DVTR main body 11 (FIG. 2) or from the real time clock 23 in the control panel 9 (FIG. 3), and the time of occurrence of a trouble can be specified by recording the time on the memory card 8.

The elapsed time since a power supply is switched on in item (3) can be obtained in the similar manner to item (2), and the elapsed time since the VTR is started in operation can be known by recording the time in the memory card 8.

The time code in item (4) is a played back signal from the magnetic tape 4 (FIG. 2) by the diagnostic portion 60 for the time code generator/reader (FIG. 5), and the position of the occurrence of a trouble on the magnetic tape 4 can be specified by recording the time code on the memory card 8.

The operation mode in item (5) is the operation mode of DVTR main body 11 at the occurrence of a trouble, and when a user designates an operation mode in operating the control panel 9, the information data is transmitted from the control panel 9 to the DVTR main body 11 as described above and stored in the CPU 6. Therefore, it is renewed every time when the operation mode is changed. When a trouble occurs, the information data is read out from the CPU 6 and stored on the memory card 8 as previously described. The using conditions of the DVTR when the trouble occurs can be specified by recording the information data on the memory card 8.

The information data of the operating conditions of the DVTR in item (8) show actual operating conditions when a trouble occurs in the mechanism portion 53, the servo portion 54, the signal processor 55, or the time code generator/reader 56 shown in FIG. 5, and the data can be used as a material for the investigation of the cause of the trouble, and the solution of the trouble can be facilitated.

The total time of use of a head in item (7) is obtained by the CPU 6 measuring the total rotating time of a head cylinder using time information from the real time clock 5, and the result is stored in the CPU 6. When a trouble occurs the information data is read out from the CPU 6 and recorded on the memory card 8 as previously described. The conditions of the head can be determined by recording the information data on the memory card 8.

The variable numerical values of recording currents in item (8) represent data to be used by a user for changing a recording current in accessing the CPU 6 from the control panel 9. The information data is renewed every time when the user changes the current, and when a trouble occurs the data thereof is output from the CPU 6 and recorded on the memory card 8. The conditions of the recording current can be made clear by recording the information data on the memory card 8.

The variable numerical values of the playback equalizer in the item (9) represents the data to be used by a user for changing the characteristics of the playback equalizer in accessing the CPU portion 6 from the control panel 9. The information data is renewed every time when the user changes the characteristics, and when a trouble occurs the data is output from the CPU 6 and recorded on the memory card 8. The characteristics of the equalizer in playback can be specified by recording the information data on the memory card 8.

The automatic equalizer in item (10) serves for changing the characteristics of the playback equalizer automatically, for example, by the error rate of playback data. The information data expressing whether such automatic action is operated or not is stored in the CPU 6, and when a trouble occurs the data is output from the CPU 6 and recorded on the memory card 8. The recorded information on the memory card 8 is useful for the judgment of an error rate in a playback mode.

The mounting/demounting information of the memory card 8 in item (11) contains the information data expressing whether the memory card 8 is mounted or not, and the data is renewed corresponding to the mounting or demounting of the memory card 8. The information data is recorded in the CPU 6.

The version number of a ROM in each portion in item (12) is a discrimination number of a ROM or a CPU which corresponds individually to a VTR in answering the request of a user. The information data is stored before hand in the CPU 6, and when a trouble occurs the data is output from the CPU 6 and recorded on the memory card 8. It is therefore easy to determine the using conditions of a DVTR by recording the information data on the memory card 8.

The setup information of a DVTR in item (13) shows the settings of individual conditions of a DVTR and is stored in the CPU 6 and when a trouble occurs, the information is output from the CPU 6 and recorded on the memory card 8. The operating conditions of the DVTR can thus be determined by recording the information data on the memory card 8.

Figure 7:
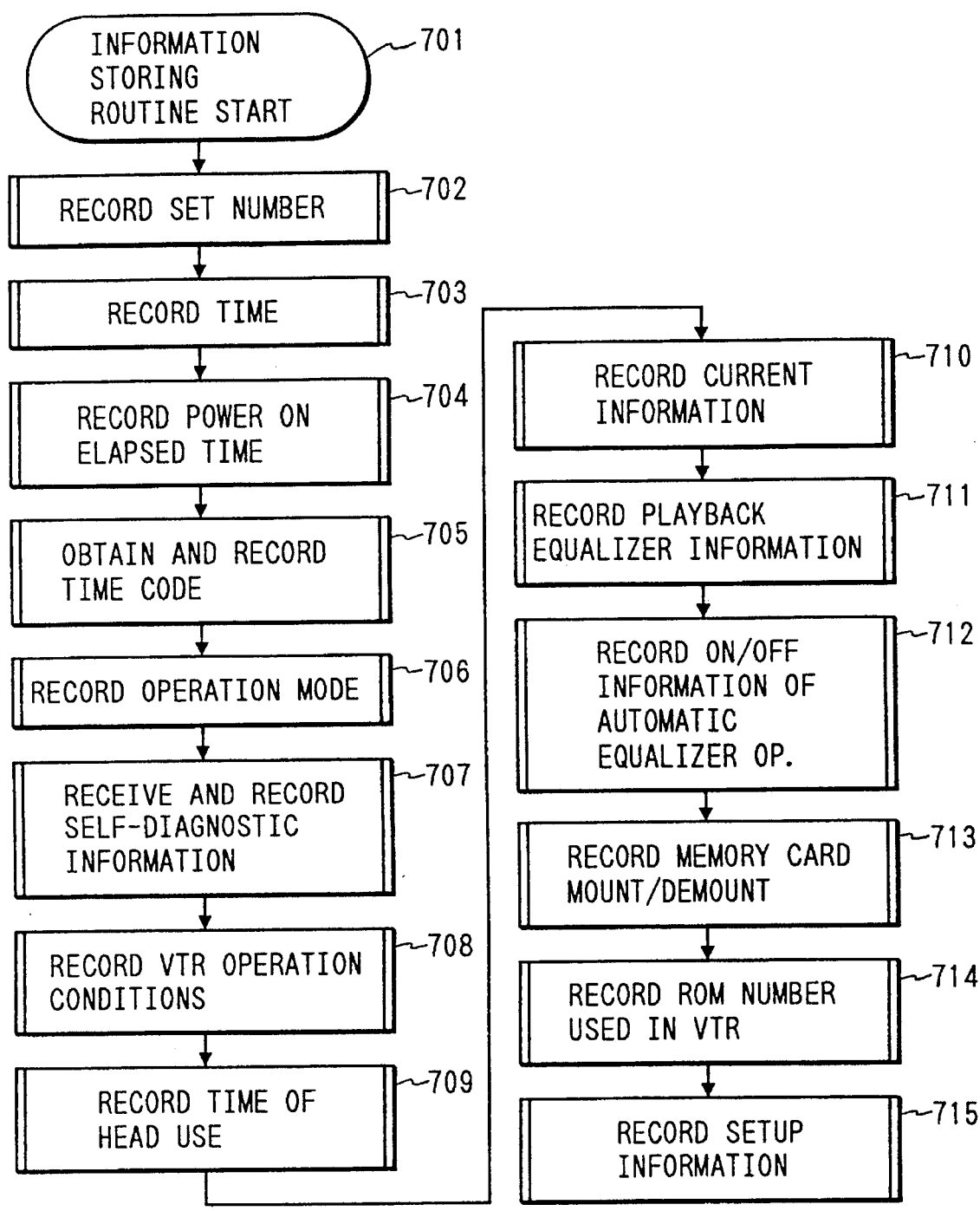
FIG. 7 is a flowchart showing an example of information data which is generated when a trouble occurs in the recording and playback apparatus and the recording order thereof on a memory card.

FIG. 7 is a flowchart showing the order of the above-mentioned information data on the memory card 8 (the mounting and demounting information data of the memory card 8 are stored in the CPU 6), and in the data, the self-diagnostic information data is included. The recording order of trouble matters is not specified and can be arbitrarily decided. The same operation is also applicable to the storage in the backup SRAM 24.

As shown in FIG. 7, starting of the information data storing routine is effected in step 701 wherein recording of the set number is effected in step 702 and recording of VTR operating conditions is effected in step 703. Thereafter, recording of the ROM number used in the VTR is effected in step 704, recording of time is effected in step 705 and recording of head using time is effected in step 706. Subsequently, there is effected recording of setup information in step 707, recording of elapsed time since the power is switched on in step 708 and recording of recording current information in step 709. Thereafter, the time code is read out from the time code generator/reader and recorded in step 710 with recording of playback equalizer information being effected in step 711 and recording of the operation mode in step 712. Thereafter, recording of ON/OFF information of the automatic equalizer operation is effected in step 713, receipt of self-diagnostic information and recording thereof is effected in step 714, and finally, recording of the memory card mounting/demounting information in step 715.

As described, by recording different information data on the memory card, noting that if it is not possible to record the information data on the memory card, the data will be recorded on the backup SRAM on the control panel 9, a trouble in the operation of a VTR can be investigated at a time subsequent to the occurrence thereof and such information can be retained for enabling not only a history of troubles occurring when an operator is not present, but also a present trouble so that the recording of data on the memory card has an important affect on the investigation of the cause of the trouble and the solving of such cause.

Figure 8:
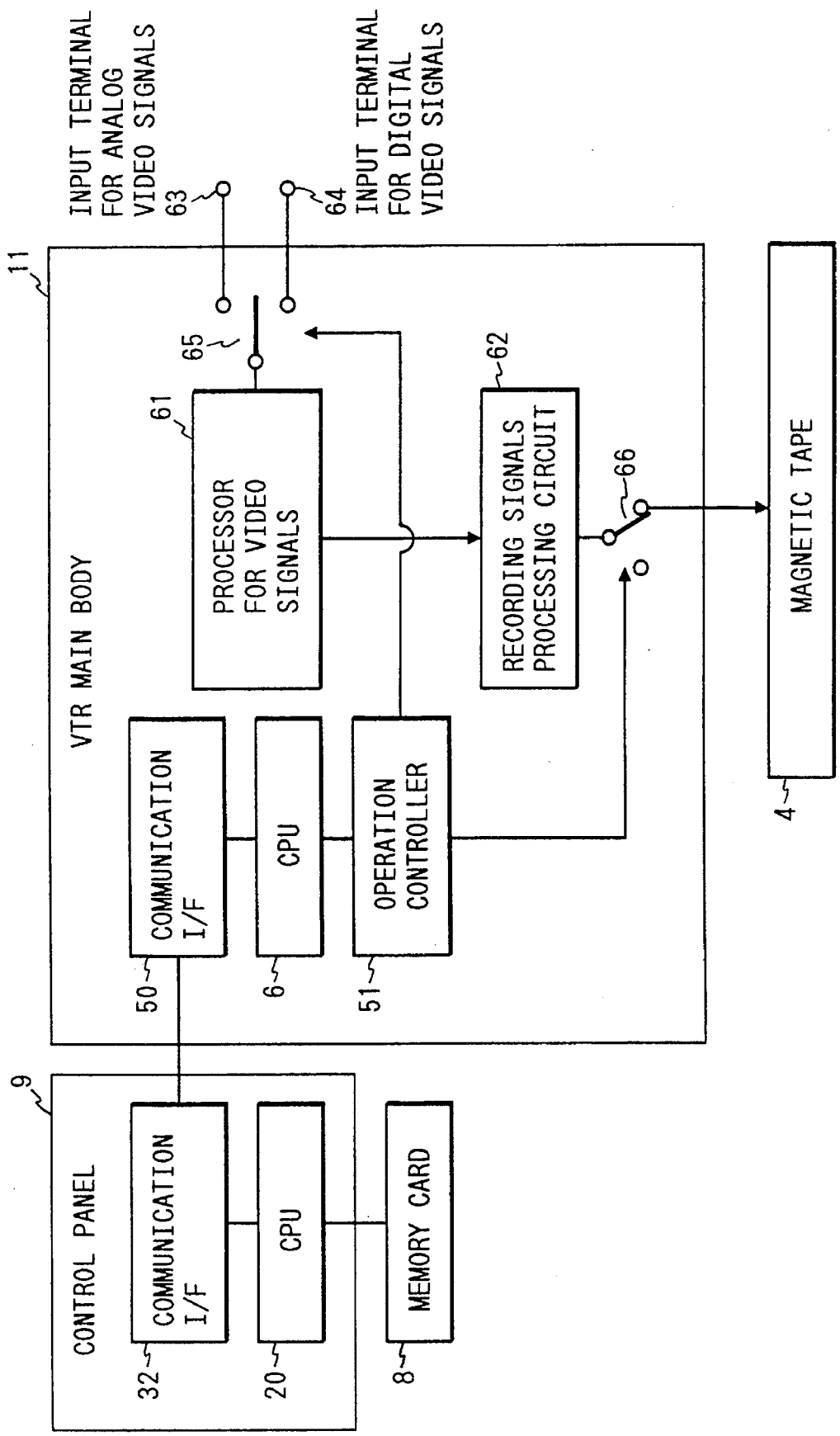
FIG. 8 is a block diagram showing another example of the memory card and recording and playback apparatus for enabling automatic setting of operational characteristics according to the present invention.

FIG. 8 shows an embodiment wherein the memory card is utilized for automatically setting the operation mode of the VTR when the memory card 8 is mounted on the control panel. As shown, the main body 11 of the VTR includes a processor 61 for video signals which is coupled by way of a switch 65 to an input terminal 63 for analog video signals and an input terminal 64 for digital video signals. The processor for video signals is coupled to a recording signal processing circuit 62 which is coupled by a switch 66 to the magnetic tape 4. As shown, the operation controller 51 serves for controlling the positions of the switches 65 and 66. However, when the VTR is normally used with an analog video input signal, the VTR may be conveniently set automatically in the analog input mode so as to avoid misoperation. When information concerning the input signals being digital, for example, is written or stored on the memory card 8, and the memory card 8 is mounted on the control panel 9, CPU 20 of the control panel 9 reads the information from the memory card 8 and transmits the information to CPU 6 via communication interfaces I/F 32 and 50. The CPU 6 checks the information and switches the switch 65 to set the input signals for digital video input signals by utilizing the operation controller 51. Furthermore, if, for example, the VTR has a mode of recording inhibition when a VTR is utilized as a playback apparatus only, the VTR may be set in a recording inhibited condition automatically in order to avoid recording of undesired information on a recorded tape. Thus, when information for recording inhibition is written and stored on the memory card 8, and the card 8 is mounted on the control panel 9, the CPU 20 reads the information from the memory card 8 and transmits the information to CPU 6 via communication interfaces I/F 32 and 50. The CPU 6 checks the information and if the recording inhibition information is present, effects switching of the switch 66 to a record inhibition condition by utilization of the operation controller 51. Thus, the memory card 8, in this manner, effects automatic setup of operational characteristics of operational mode of the VTR, and it is apparent that such automatic setup is not limited to the aforementioned two setup conditions. Additionally, it is apparent that extension of the automatic setup to different operational conditions or characteristics for operation modes of the VTR is easily effected.

As described above, the apparatus of the present invention utilizes a memory card for use with a recording information and playback apparatus which memory card enables storage of information relating to operational characteristics of the recording and playback apparatus and when the memory card is mounted onto the control panel of the recording and playback apparatus enables automatic setting of operational characteristics of the recording and playback apparatus. Additionally, information data of a trouble which unexpectedly occurs during operation of the recording and playback apparatus is arranged to be stored in a memory card mountable on a control panel of the recording and playback apparatus or a storage device of the recording and playback apparatus so that investigation of the trouble can be performed at any time while referring to the data recorded at a later time than the occurrence of the trouble, which makes it possible to investigate the cause of a trouble and to enable fast and correct consideration of countermeasures.

While the present invention has been described in some detail with respect to the particular embodiments shown in FIGS. 1–8 directed to a DVTR, it is readily apparent that the present invention is not limited to a DVTR and as will be appreciated by one of ordinary skill in the art the present invention is subject to many modifications. The present invention is intended to encompass all such modifications, and the scope of the present invention is to be determined solely with reference to the appended claims.

What is claimed is:

1. A recording and playback apparatus comprising:

means for recording information on a recording medium in a recording mode and for playing back recorded information from the recording medium in a playback mode;

self-diagnostic means for detecting a trouble occurring during at least one of the recording and playback modes;

means for generating self-diagnostic information relating to the trouble through the self-diagnostic means;

means for generating information indicative of a location of the occurrence of the trouble on the recording medium; and a memory card associated with the recording and playback apparatus for storing the generated self-diagnostic information with the information indicative of the location of the trouble.

2. A recording and playback apparatus according to claim 1, wherein the memory card is mountable to the recording and playback apparatus.

3. A recording and playback apparatus according to claim 2, wherein the means for generating information indicative of a location of the occurrence of the trouble on the recording medium generates a time code indicative of the location of the occurrence of the trouble on the recording medium.

4. A recording and playback apparatus according to claim 2, wherein the recording and playback means includes means for generating operation mode setting conditions of the recording and playback means at the trouble occurrence, and the memory card storing the operation mode setting conditions.

5. A recording and playback apparatus according to claim 2, wherein the recording and playback means includes means for generating information of real time and lapse of time after a power supply is switched on upon occurrence of a trouble condition, and the memory card storing the real time and lapse of time information.

6. A recording and playback apparatus according to claim 2, wherein the recording and playback apparatus includes means for generating operation conditions upon occurrence of a trouble, and the memory card for storing information of the operating conditions.

7. A recording and playback apparatus according to claim 2, wherein the recording and playback means includes storage means for storing information of the self-diagnostic information from the self-diagnostic means when the memory card is one of not mounted to the recording and playback means and not in a recordable state.

8. A recording and playback apparatus according to claim 7, wherein when the memory card is mounted on the recording and playback means and the memory card is in a recordable state, the information from the self-diagnostic information means is recorded on the memory card at least one of from the self-diagnostic means and from the storage means.

9. A recording and playback apparatus according to claim 7, wherein the recording and playback means includes display means for displaying a message indicating that the memory card is not in a recordable state when the self-diagnostic information is recorded in the storage means.

10. A recording and playback apparatus according to claim 2, wherein the memory card includes means for ranking the recorded information in order of importance.

11. A recording and playback apparatus according to claim 10, wherein the memory card includes means for erasing data of low rank and importance when the means for recording information overflows, and enabling new information to be recorded in order.

12. A recording and playback apparatus according to claim 2, wherein the memory card includes means for recording initialization information and for enabling initialization in accordance with the recorded initialization information.

13. A recording and playback apparatus according to claim 2, wherein the memory card includes means for storing information indicative of a set mode of operation of the recording and playback means.

14. A recording and playback apparatus according to claim 2, wherein the memory card includes write protection means for prohibiting a rewriting operation of the operational characteristics automatically set for the recording and playback means.

15. A recording and playback apparatus according to claim 1, wherein the memory card includes write protection means for prohibiting a rewriting operation of the operational characteristics automatically set for the recording and playback means.

16. A recording and playback apparatus according to claim 1, wherein the memory card is insertable in a portion of the recording and playback apparatus for automatically setting operational characteristics of the recording and playback means and is removable from the recording and playback apparatus so as to not be fixedly mounted therein.

17. A recording and playback apparatus according to claim 1, wherein the self-diagnostic means automatically detects the trouble and in response thereto the means for generating self-diagnostic information automatically generates the self-diagnostic information relating to the trouble.

18. A recording and playback apparatus comprising:

means for recording information on a recording medium in a recording mode and for playing back recorded information from the recording medium in a playback mode;

self-diagnostic means for detecting a trouble occurring during at least one of the recording and playback modes;

means for generating self-diagnostic information relating to the trouble through the self-diagnostic means;

means for generating information indicative of the identification number of the recording and playback apparatus; and a memory card associated with the recording and playback apparatus and for storing the generated self-diagnostic information with the information of the identification number of the recording and playback apparatus.

19. A recording and playback apparatus according to claim 18, wherein the self-diagnostic means automatically detects the trouble and in response thereto the means for generating self-diagnostic information automatically generates self-diagnostic information relating to the trouble.

20. A recording and playback apparatus according to claim 18, wherein the means for generating identification number information further generates discrimination numbers of at least one of a read only memory and a random access memory and the memory card means stores the discrimination numbers.

21. A recording and playback apparatus according to claim 18, wherein the memory card is mountable to the recording and playback apparatus.

22. A recording and playback apparatus comprising means for recording information and for playing back the recorded information, the recording and playback means including self-diagnostic means for detecting a trouble occurring in at least one of a recording and playback operation and for generating self-diagnostic information relating to the trouble, and a memory card mountable to the recording and playback means and including means for recording at least the self-diagnostic information generated by the self-diagnostic means.

23. A recording and playback apparatus according to claim 22, wherein the recording and playback means includes means for generating a time code indicating a position of the occurrence of trouble on a recording medium, and the memory card including means for recording the time code information.

24. A recording and playback apparatus according to claim 22, wherein the recording and playback means includes means for generating operation mode setting conditions of the recording and playback means at the trouble occurrence, and the memory card means including means for recording the operation mode setting conditions.

25. A recording and playback apparatus according to claim 17, wherein the recording and playback means includes means for generating information of real time and lapse of time after a power supply is switched on upon occurrence of a trouble condition, and the memory card including means for storing the real time and lapse of time information.

26. A recording and playback apparatus according to claim 22, wherein the recording and playback means includes means for generating operation conditions upon occurrence of a trouble, and the memory card includes means for storing information of the operating conditions.

27. A recording and playback apparatus according to claim 22, wherein the recording and playback means includes means for generating information indicative of the identification number of the recording and playback means and discrimination numbers of at least one of a read only memory and random access memory thereof, the memory card including means for recording the information of the identification number and discrimination numbers.

28. A recording and playback apparatus according to claim 22, wherein the recording and playback means includes storage means for storing information of the self-diagnostic information from the self-diagnostic means when the memory card is one of not mounted to the recording and playback means and not in a recordable state.

29. A recording and playback apparatus according to claim 28, wherein when the memory card is mounted on the recording and playback means and the memory card is in a recordable state, the information from the self-diagnostic information means is recorded on the memory card at least one of from the self-diagnostic means and from the storage means.

30. A recording and playback apparatus according to claim 28, wherein the recording and playback means includes display means for displaying a message indicating that the memory card is not in a recordable state when the self-diagnostic information is recorded in the storage means.

31. A recording and playback apparatus according to claim 22, wherein the memory card includes means for ranking the recorded information in order of importance.

32. A recording and playback apparatus according to claim 31, wherein the memory card includes means for erasing data of low rank and importance when the means for recording information overflows, and enabling new information to be recorded in order.

33. A recording and playback apparatus according to claim 22, wherein the memory card includes means for recording initialization information and for enabling initialization in accordance with the recorded initialization information.

34. A recording and playback apparatus according to claim 22, wherein the memory card includes means for storing information relating to operational characteristics of the recording and playback means.

35. A recording and playback apparatus according to claim 34, wherein the memory card enables automatic setting of the operational characteristics of the recording and playback means in accordance with the stored information relating thereto.

36. A recording and playback apparatus according to claim 35, wherein the memory card includes write protection means for prohibiting a rewriting operation of the operational characteristics automatically set for the recording and playback means.

37. A recording and playback apparatus according to claim 22, wherein the memory card is insertable in a portion of the recording and playback apparatus and removable therefrom so as to not be fixedly mounted therein.

38. A recording and playback apparatus according to claim 22, wherein the self-diagnostic means automatically detects the trouble and in response thereto automatically generates self-diagnostic information relating to the trouble.

* * * * *